G. W. LESTER.
SAFETY APPLIANCE FOR PIT CAGES, LIFTS, AND THE LIKE.
APPLICATION FILED JULY 13, 1911.
1,043,323.
Patented Nov. 5, 1912.
2 SHEETS—SHEET 1.
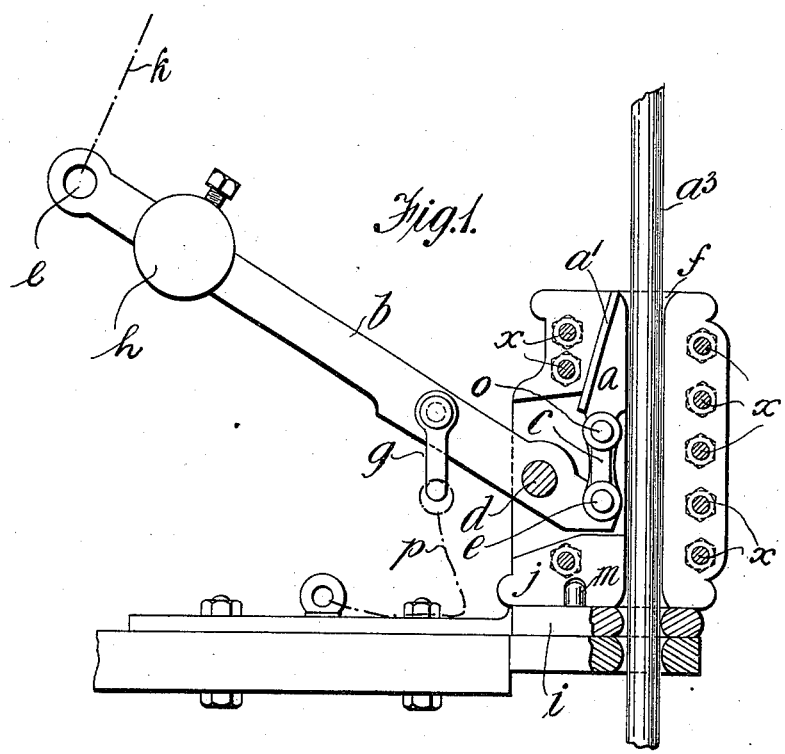
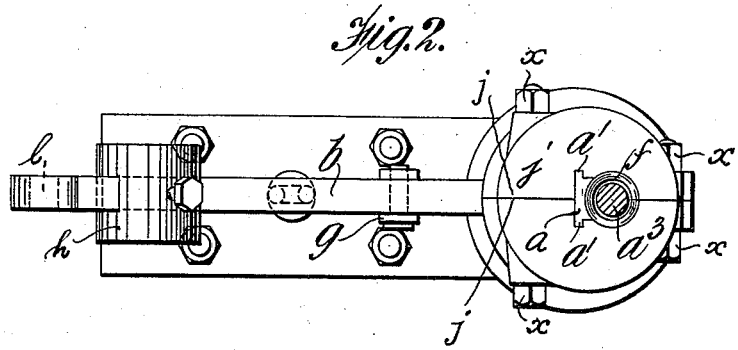
WITNESSES
R. C. Braddock.
Emory L. Groff
INVENTOR
George William Lester.
By
D. T. Kolhaupter
His Attorney

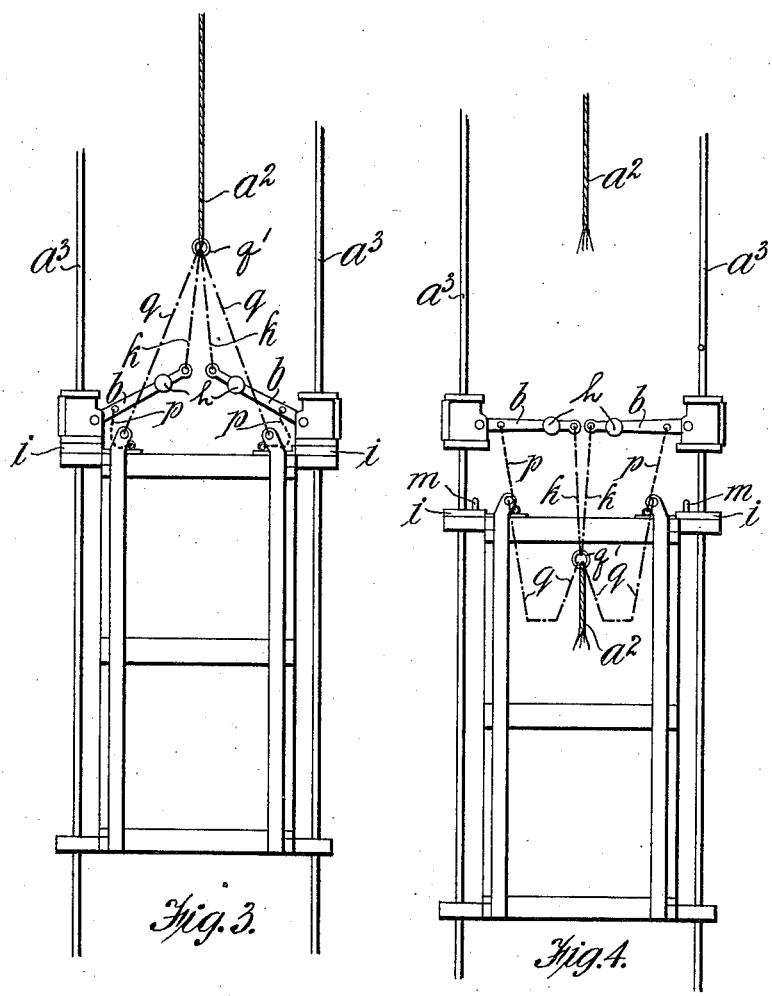

![UNITED STATES PATENT OFFICE.]

GEORGE WILLIAM LESTER, OF BANGOR, ENGLAND.

SAFETY APPLIANCE FOR PIT CAGES, LIFTS, AND THE LIKE.

1,043,323.

Specification of Letters Patent.   Patented Nov. 5, 1912.

Application filed July 13, 1911.   Serial No. 638,387.

*To all whom it may concern:*

Be it known that I, GEORGE WILLIAM LESTER, a subject of the King of Great Britain and Ireland, and resident of Bangor, in the county of Carnarvon, Wales, have invented certain new and useful Improvements in Safety Appliances for Pit Cages, Lifts, and the Like, of which the following is a specification.

This invention of an improved safety appliance for pit cages, lifts and the like relates to the type of safety gripping apparatus in which, upon the severance of the suspension devices, wedge shaped pawls carried by pivoted and inwardly extending levers are automatically caused to grip the guide ropes or conductors upon which they travel and to so arrest the descent of the cage, lift or the like, and the present invention has for its object the improved combination, construction and arrangement of parts as hereinafter described, pointed out in the claims and illustrated by the drawings accompanying this application, in which:—

Figure 1 is a vertical section of the entire clutch. Fig. 2 is a top view of the clutch. Fig. 3 illustrates the method of attachment; and, Fig. 4 shows the appliance in action.

Similar letters of reference relate to similar parts throughout the views.

Referring to the drawings:—the letter $a$ designates the lock-wedge; $a^1$ the flanges on the lock-wedge; $a^2$ the winding rope or hauling cable; $a^3$ the guide ropes or conductors; $b$ the actuating lever or clutch arm; $c$ the connecting rod or link between the lever arm $b$ and the wedge $a$; $d$ the axle or bearing pin for the lever arm $b$; $e$ and $o$ denote the connecting rod pins; $f$ the rope tunnel; $g$ the connecting shackle; $h$ an adjustable balance weight; $i$ designates the base plate and $j$ the clutch casing; $k$ is the connecting cable from the lever to the winding rope; $l$ is an eye at the end of the actuating lever arm; $m$ refers to the dowel pins in the base plate; $p$ the connecting chains between the cage and shackles of the lever arms $b$; while $q$ denotes the chains connecting the cage or lift to the winding rope and $q^1$ refers to the ring at the end of the winding rope.

The casing of the clutch is manufactured of malleable cast iron, or could be stamped from mild steel in two sections, to enable same to be fitted to existing guide ropes without interfering with the guide ropes in any way, the two sections of the clutch being secured together by a series of bolts $x$ passing through projecting flanges or ribs provided on each section for this purpose. There is a tunnel $f$ through the clutch which is rather larger than the exact diameter of the guide rope or conductor. The aforesaid tunnel is flared at the top and bottom of the clutch casing to allow full freedom of rope travel, or vice versa. Adjacent to one side of the rope tunnel is a lock-wedge $a$, made of steel, and adapted to work in a recess arranged at an angle to the rope tunnel $f$.

The lock-wedge $a$ has a flange $a^1$ on either side and each section of the clutch casing is grooved to receive the flange $a^1$ of the lock-wedge $a$. The flanges $a^1$ are introduced to prevent the wedge from falling into contact with the guide rope when the clutch is out of action. The lock-wedge $a$ is actuated by the downward movement of the lever $b$ which is mounted upon the bearing axle $d$, and to the end of the actuating lever $b$ is attached a connecting rod $c$ which is further connected to the lock-wedge $a$ by pins $e$ and $o$ respectively. The clutch may be made in various sizes to fit various guide ropes or conductors now in use.

The action of the clutch summarized is:—that the wedge $a$ is forced into locking position by the downward stroke of the actuating lever $b$. Each clutch is mounted upon a base-plate $i$ which is made in two sections and is bolted to the top or roof of the cage or lift and is provided with a flared opening for the passage of the guide rope or conductors. In the base-plate are two upwardly projecting dowel pins $m$ (only one of which is shown) which are made to fit loosely into corresponding dowels in the bottom of the clutch to prevent same swiveling from side to side when the cage or lift is in motion.

*Method of attachment to cages, lifts and the like.*—A complete appliance consists of four clutches (one clutch to operate upon each guide rope or conductor $a^3$). The clutches are fitted to each corner of the roof of the cage or lift and remain out of action so long as the connecting cables $k$—Fig. 3—(attached to the loop or eye $l$ of the lever $b$) are kept taut by the link $q^1$ connected to the end of the winding rope $a^2$. A glance at Fig. 3 will show the connecting chains $p$ to be hanging loosely and the actuating levers $b$ to be in an oblique position, but in the event of a rope breakage (see Fig. 4) the connections $k$ and the chains $q$ immediately fall on the top of the cage or lift, which naturally for a certain distance commences to travel down the shaft, being detached from the winding rope $a^2$. However, at this stage the appliance comes into action, for with the falling of chains and connections $q$ and $k$ respectively, the levers $b$ (weighted by an adjustable balance weight $h$) also fall and to a certain extent force up the lock-wedges in each of the clutches, thereby engaging the clutches with the guide ropes or conductors $a^3$. Immediately afterward the full weight of the cage or lift is suspended upon the chains $p$, connected to the levers $b$, which in turn force up the lock-wedges in the clutches still further, causing an effectual lock which cannot be released until the cage or lift be hauled up to allow the weight to be removed from levers $b$.

Having now described my invention what I claim as new and desire to secure by Letters Patent of the United States is:—

1. In a safety appliance of the character set forth, the combination with a cage, a hauling rope and guide ropes, of a clutch casing for each guide rope separately connected with the cage, a weighted lever arm pivoted in said casing, a lock wedge connected to the lever arm and adapted to engage its respective guide rope, and a connection between the lever arm and the cage.

2. In a safety appliance of the character set forth, the combination with a cage, a hauling rope and guide ropes, of a clutch device for each guide rope including a weighted lever arm, a chain connection between the lever arm and the cage, and a lock-wedge adapted to be automatically forced into binding engagement with the guide rope by the said weighted lever arm, said lock-wedge being further forced and held into engagement with the guide rope by the weight of the cage suspended from the said chain connection.

3. In a safety appliance of the type set forth, the combination with the cage and guide ropes therefor, of a clutch device for each guide rope including a two-part base plate secured to the roof of the cage, upwardly extending dowel pins on the said base plate, a two-part clutch casing having recesses to receive the dowel pins, said clutch casing further provided with a trunnel to receive the guide rope and a T-shaped recess, a lock-wedge of a shape corresponding to the recess and slidable therein, a weighted lever arm pivoted in the casing for actuating the said lock-wedge, a link pivotally connecting one end of said weighted lever arm and the lock-wedge, a chain connected to the lever arm and the cage, a hauling rope for elevating and lowering the cage, and a cable connected to the hauling rope and lever arm.

In testimony whereof I have affixed my signature in presence of two witnesses.

GEORGE WILLIAM LESTER.

Witnesses:
H. M. BROOKFIELD DAVIES,
H. A. RODGERS.

---

Copies of this patent may be obtained for five cents each, by addressing the "Commissioner of Patents, Washington, D. C."